United States Patent [19]

Gossler

[11] Patent Number: 4,928,498

[45] Date of Patent: May 29, 1990

[54] METHOD AND DEVICE FOR COMPRESSION OF GASES

[76] Inventor: Ewald Gossler, 73 Traunsteinstrasse, A-4810 Gmunden, Austria

[21] Appl. No.: 298,833

[22] Filed: Jan. 18, 1989

Related U.S. Application Data

[63] Continuation of Ser. No. 927,262, Nov. 4, 1986, abandoned.

[30] Foreign Application Priority Data

Nov. 8, 1985 [AT] Austria ............................. 3224/85
Nov. 28, 1985 [AT] Austria ............................. 3467/85

[51] Int. Cl.$^5$ ............................................. F25D 21/06
[52] U.S. Cl. ............................................ 62/81; 62/82;
62/152; 62/156; 62/278
[58] Field of Search ............... 62/151, 152, 155, 156,
62/234, 238.5, 278, 158, 182, 93, 276, 80, 81, 82;
165/122; 55/DIG. 17, 267

[56] References Cited

U.S. PATENT DOCUMENTS

| | | | |
|---|---|---|---|
| 2,492,970 | 1/1950 | Curry .................................. | 62/182 |
| 2,763,132 | 9/1956 | Jue ..................................... | 62/152 X |
| 2,879,976 | 3/1959 | Rose, Sr. ............................ | 165/122 |
| 3,273,635 | 9/1966 | Jobes ................................. | 62/155 X |
| 3,453,837 | 7/1969 | Sandstrom et al. .............. | 62/276 X |
| 3,453,838 | 7/1969 | Decker et al. ..................... | 62/234 X |
| 3,572,052 | 3/1971 | Toth ................................... | 62/155 X |
| 3,623,334 | 11/1971 | Heidorn ............................. | 62/156 X |
| 3,732,703 | 5/1973 | Nordstrom et al. .............. | 62/151 X |
| 4,237,696 | 12/1980 | Coblentz .......................... | 55/DIG. 17 |

*Primary Examiner*—Harry B. Tanner
*Attorney, Agent, or Firm*—Kurt Kelman

[57] ABSTRACT

The invention relates to a method and a device for compression of gases, in particular of air, within a compressed air piping system. The air drawn in for the compressor is cooled below 0° C. within a freeze-dehumidifer in a cooling channel. The supply of under-cooled refrigerant into the freeze-dehumidifier is interrupted during the defrosting of the freeze-dehumidifier situated within the cooling channel for the air drawn in towards the compressor. The condensate appearing in the form of ice on the freeze-dehumidifer is separated thereby. The defrosting operation is terminated after a pressure of the refrigerant corresponding to a positive temperature of the freeze-dehumidifier is exceeded, or after a presettable period has elapsed. The pressure of the refrigerant is monitored in the suction pipe and if appropriate in the delivery or pressure pipe of the refrigerant compressor.

9 Claims, 5 Drawing Sheets

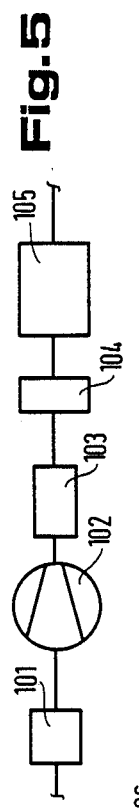
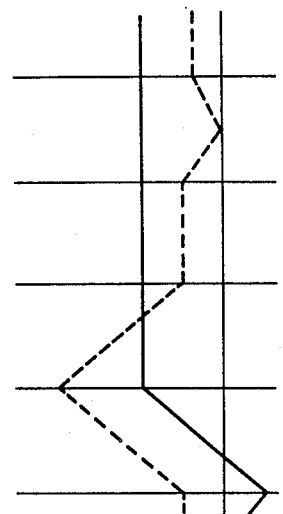
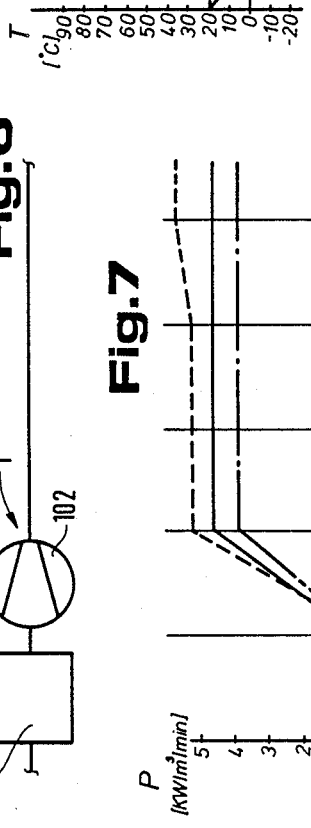
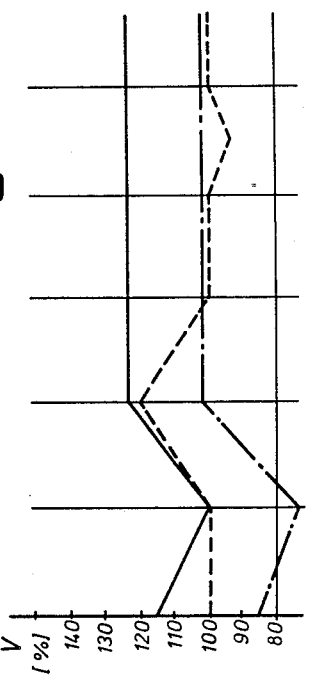
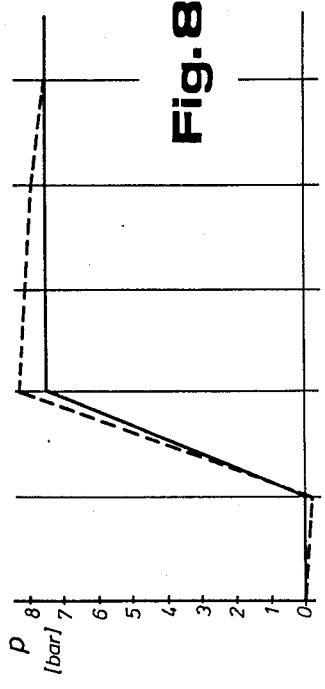

METHOD AND DEVICE FOR COMPRESSION OF GASES

This application is a continuation of application Ser. No. 06/927,262, filed 11/04/86, abandoned.

BACKGROUND OF THE INVENTION

1. Field of the Invention

The invention relates to a method and device for the compression of gases, in particular of air in a compressed air ducting system, in which the intake air of the compressor is cooled by means of a freeze-drier to below 0° C. in a cooling section and the condensate occurring in the form of ice is eliminated.

2. Description of the Prior Art

A known method for operation of a displacement compressor of the same applicant—according to DE-OS 29 50 133— specifies that the intake air of the compressor is cooled to below 0° C. in a freeze-drying installation for generating compressed air. The condensate obtained in the form of ice is separated. The temperature difference between the temperature of the intake air at the inlet of the freeze-drying system and the temperature of the intake air at the intake of the compressor should amount to between 35° C. and 45° C. The compression dewpoint in the compressed air pipe connected direct to the outlet of the compression stage should lie below the intake temperature of the intake air of the freeze-drying system. The outlet of the compressor is connected direct to the compressed air pipe. It is possible thereby to make available a greater volume of anhydrous compressed air whilst omitting the aftercoolers, as a function of the higher compressed air temperature in the consumer means. Furthermore, condensate separations are also averted in longer compressed air piping systems or extensive compressed air installations. The method proved very satisfactory in practice. The dedewing of the freezedriers could not however be resolved satisfactorily in all cases.

OBJECTS AND SUMMARY OF THE INVENTION

The present invention now has as its fundamental object to simplify the course of the dedewing operation of the heat exchangers in a method for the compression of gases, or rather to devise a method for generation of compressed air with which the operational advantages secured by cooling of the intake air may be improved complementarily and a greater power saving may be accomplished.

This problem of the invention is resolved in that during the dedewing or dewatering of the "freezedrier" or dehumidifier situated within the cooling path of the air drawn by suction towards the compressor, the infeed of supercooled refrigerant into the freeze-dehumidifier is interrupted the pressure in the intake pipe and if appropriate in the delivery pipe of the refrigerant compressor is monitored and the dehumidifying operation is terminated after exceeding a refrigerant pressure corresponding to a positive temperature of the freeze-dehumidifier or after a presettable period has elapsed. Since the "supercooling" of the freeze-dehumidifier by the refrigerant is interrupted, the freeze-dehumidifier may be freed of condensate within a short time by means of the air flowing past and drawn in by the compressor, as well as, if applicable, by a flow of hot refrigerant through the freeze-dehumidifier. Furthermore, the instant in which the temperature in the area of the heat exchanger lies above 0° C. and the dewatering operation is thus completed, may be determined precisely by establishing the pressure conditions in the intake pipe and if appropriate in the delivery pipe of the refrigerant circuit stopped during the dewatering operation. This temperature detection is unaffected by flows of gas or air movements occurring within the freeze-dehumidifier so that defective measurements are prevented in sufficient degree.

According to another modified form of this inventive method, it is specified that the temperature of the compressed air drawn into the compressor is detected after egress from the freeze-dehumidifier and the dewatering operation is terminated at a positive temperature value and at the same time at a pressure of the refrigerant in the suction pipe leading to the refrigerant compressor which corresponds to a positive temperature of the freeze-dehumidifier. Thanks to the simultaneous determination of the gas or air temperature in the egress section of the freeze-dehumidifier, it is possible to balance the two readings and to perform a reciprocal check, so that the dewatering operation may be performed economically and efficiently.

It is advantageous if hot refrigerant vapour flows through the freeze-dehumidifier during the freeze-dehumidifier dewatering operation, and if at the end of the dewatering operation, the refrigerant is fed via an expansion valve to the freeze-dehumidifier, since it is possible thereby to reduce the period during which the compressor draws in humid and possibly unfiltered air in the case of a single form of a freeze-dehumidifier, since the dewatering operation is enhanced complementarily to the dewatering action caused by the gas or air drawn in, thanks to the flow of hot refrigerant vapour through the freeze-dehumidifier.

Provision is made according to another process step that, during the dewatering operation of the freeze-dehumidifier, the refrigerant circuit in the freeze-dehumidifier is interrupted and the air required for compression for the compressor is drawn in via the freeze-dehumidifier, and that the refrigerant circuit is activated again at a pressure in the stopped section of the refrigerant circuit of the freeze-dehumidifier which corresponds to a plus temperature of the surface of the freeze-dehumidifier and at a suction temperature of at least 1° C. of the compressed air at the outlet of the freeze-dehumidifier, thereby securing a favourable energy balance, since no additional energy is required to vapourise the condensate frozen solid on the freeze dehumidifier.

Provision is made according to another form of embodiment for the gas drawn in to be fed to the compressor via at least two different cooling channels and that during the intake by suction via one cooling channel, the other cooling channel is defrosted and is closed off airtight between the freeze-dehumidifier system and the compressor. By this surprisingly uncomplicated solution the performance of the freeze-dehumidifier may be utilised in optimum manner for cooling below zero of the gas drawn in. It is assured that only anhydrous gas is fed to the suction side of the compressor, since a penetration by air saturated with water or by vapour or gas saturated with water after the freeze-dehumidifier cooling the gas below zero is prevented reliably by the gas tight sealing off of other suction paths in the course of defrosting or dewatering operation.

Provision is made according to another feature of the invention that the gas which is to be compressed is drawn in between the hermetically closed off section of the cooling channel and the freeze-dehumidifier arranged therein, is fed through the freeze-dehumidifier to the intake of the freeze-dehumidifier of the further cooling channel and via the same to the compressor, whereupon the further cooling channel is closed off hermetically between the freeze-dehumidifier and the compressor in particular after a presettable period has elapsed and the gas drawn in is fed via the freeze-dehumidifier situated in this cooling channel and via the freeze-dehumidifier situated in the other cooling channel and to the compressor, so that the energy applied to cause the condensate precipitated to freeze solid may be utilised for precooling of the gas drawn in during the defrosting operation and that it is possible to cope with a lesser energy absorption of the plant as a whole, if the temperature of the gas drawn in normally lies above 0° C.

It is also possible that the gas drawn in may be fed via the freeze-dehumidifier of the one cooling channel to the freeze-dehumidifier of the other cooling channel and from the latter to the compressor, that the freeze-dehumidifier of the one cooling channel is precooled and that during this action gas is drawn in between the two freeze-dehumidifiers and the infeed of gas is interrupted between the section closed off in airtight manner and the freeze-dehumidifier of the one cooling channel and the supply opening is closed off in airtight manner in the intake direction, whereupon the hermetically closed off section between the freeze-dehumidifier and the compressor of this cooling channel is opened and a section of the other cooling channel is closed off between the compressor and the additional freeze-dehumidifier, the gas is thereupon drawn in between the hermetically closed off section and the freeze-dehumidifier of the additional cooling channel and the infeed of gas is thereupon interrupted between the two freeze-dehumidifiers. Thanks to this inventive process incorporating the precooling of the defrosted freeze-dehumidifier preceding the switching operation, it is possible to prevent the penetration of air or gas saturated with vapour or humidity into the suction or intake section of the compressor.

Furthermore, it is also possible that heat energy may be supplied to the freeze-dehumidifier after the hermetic closing off of a section situated between the freeze-dehumidifier and the compressor of a cooling channel, the temperature may be measured in the area of the freeze-dehumidifier and the defrosted freeze-dehumidifier may be precooled when a preset temperature is reached which corresponds to an ice-free evaporator, whereupon the hermetically closed off section is opened and the section allocated to the other cooling channel is closed off hermetically. Hence, the advantages of the inventive method may also be applied in the section in which the temperature of the gas drawn in lies under 0° C.

It is advantageous if the freeze-dehumidifier which is to be defrosted is supplied with the warm refrigerant gas coming from the refrigerant compressor, and if this gas is ducted through the freeze-dehumidifier parallel to the condenser and ducted through the freeze-dehumidifier against the normal direction of flow of the refrigerant. If the pressure of the refrigerant gas or vapour is measured in the ingress and/or egress sections of the freeze-dehumidifier and the temperature of the refrigerant gas or vapour is determined from the pressure, and the defrosting operation is terminated upon reaching a presettable temperature and the freeze-dehumidifier is precooled, the freeze-dehumidifier cools the air drawn in to below zero and the additional freeze-dehumidifier connected in parallel is defrosted. In view of the opposed direction of flow of the refrigerant, the heat engendered during defrosting may assist the defrosting operation whilst rising, along the still iced-up evaporator. Furthermore the determination of pressure in the refrigerant flowing in the refrigerant system may be performed more precisely and simply than the corresponding temperature monitoring operation, so that the precision and efficiency of the cooling operation may be controlled more precisely.

The invention also encompasses a device for compression of gas, in particular of air in a compressed air ducting system, in which the gas drawn in by the compressor is cooled to below 0° C. in a cooling channel by means of a freeze-dehumidifier and the condensate obtained in the form of ice is separated, and in which the freeze-dehumidifier is preconnected to the compressor, for implementation of the method.

This device is characterised in that the intake connector of the compressor is preceded by two mutually parallel cooling channels incorporating freeze-dehumidifiers, and that a closing valve which is gastight in, and, if applicable, against a direction of flow as well as with respect to the ambient atmosphere and which may be shifted into a closed position from an open position by means of remotely controllable drives, is situated between the outlet of the dehumidifier and the entry of suction pipes joined to the same leading into a common suction pipe and/or a suction stub pipe of the compressor. It is possible thereby in an uncomplicated manner to implement the inventive method with components of a freeze-dehumidifier and of a cooling channel which are available in the trade.

It is also possible that the closing plate of the gastight closing valve may be coupled in motion with a drive, e.g. a pressure fluid drive, which may for example be acted upon by the control device via a remotely controllable electromagnetic valve. The closing plate may be displaced with precision thanks to the power-operated displaceability of the closing plate, even upon the onset of hoar frost or incipient icing up.

It is advantageous if fins of a heat exchanger of the dehumidifier preceding the gastight closing valve are spaced apart at right angles to the throughflow direction of the gas drawn in by a distance of at least 4 mms to a maximum of 10 mms and that, preferably, the individual pipe ducts of the heat exchangers as well as their fins are staggered in the throughflow direction of the gas drawn in and overlap merely in the end face areas and that a fin of an adjacent pipe duct of the heat exchanger may be situated say centrally between two fins allocated to a pipe duct of the heat exchangers, since clogging of the fins, i.e. a bridge formation of the ice between the fins is thereby prevented.

It is also possible that the throughflow direction of the refrigerant in the pipe ducts of the heat exchanger may be opposed to the direction of flow of the gas drawn in, the gas drawn in thereby coming into contact with the refrigerant cooled to the lowest point and with the coldest evaporator surfaces in the terminal section of the dehumidifier, so that the gas drawn in may be undercooled with accuracy.

Provision is made according to another embodiment, for the cooling channel between the air intake area and the suction stub of the compressor to be made gastight, thereby preventing extraneous air from being drawn in the region of the cooling channel and thus securing thermally stable conditions in the freeze-dehumidifier.

According to another embodiment the heat exchanger extends from the air intake section in the direction towards the suction stub of the compressor, an injection device, e.g. an expansion valve, for the refrigerant is situated in the terminal portion facing towards the same, the suction pipe for the refrigerant compressor is situated in the oppositely positioned terminal portion facing towards the suction section, the pressure outlet of the refrigerant compressor is connected to the injection device via cooling systems, the refrigerant compressor and if appropriate the injection device in each case being preceded by a pressure and temperature measuring device respectively, a by-pass pipe branches off between the pressure outlet of the refrigerant compressor and the cooling system following the same and is in communication via control valves and valves at the intake of the heat exchanger direct with the pressure outlet of the refrigerant compressor in the switching position, and in one switching position with the pressure outlet of the refrigerant compressor via the expansion valve and a condenser, so that a temperature check is possible in an uncomplicated manner as a function of the differential pressure conditions in the different sections of the refrigerant circuit, and a reversal of the refrigerant flow and thus a rapid switching action is possible between the cooling and defrosting operations by switching over two valves.

It is also advantageous if the heat exchanger of the freeze-dehumidifier is followed by an air guiding plate made in the form of a sieve, whereof the aperture cross-section amounts to approximately 50% of the total passage cross-section. An even air distribution is obtained by means of the air guiding plate in combination with its passage cross-section in the outflow section of the heat exchanger into the suction pipe, since the suction cone is enlarged and uniform airflow is thereby secured approximately throughout the passage cross-section of the dehumidifier. Furthermore, the complementary deflection of the airflow in the area of the air guiding plate or deflector allows improved separation of dirt particles and water droplets.

It is also possible that the velocity of the suction air which is to be undercooled may amount to between 0.6 and 1.3 m/sec before the heat exchanger, since the speed in the area of the freeze-dehumidifier is reduced even more by the suction speed of the suction air before the heat exchanger, so that several water droplets or dirt particles combine into a larger droplet or particle and may thereby be separated more easily in the area of the dehumidifier, or in that of an air deflector plate if the latter follows said dehumidifier.

The two cooling channels may be connected at the suction side via a gastight connecting pipe and a closing valve may be situated between the internal volume of the connecting pipe and the ambient air, said valve being sealed off from the ambient air in the direction of the connecting pipe, a closing valve gastight with respect to the ambient air is placed between each of the two heat exchangers and the gastight closing valves arranged between these and the suction stub of the compressor, whereby the gas may alternately be drawn in through one of the two cooling channels and the two freeze-dehumidifiers may at the same time be utilised alternately as a precooler and principal cooler.

BRIEF DESCRIPTION OF THE DRAWINGS

The invention will now be described, by way of example, with reference to the accompanying partly diagrammatic drawings, in which:

FIG. 2 is a block connection diagram of a modified embodiment of an inventive device comprising two freeze-dehumidifiers arranged mutually parallel, in which the defrosting of the dehumidifiers is performed by means of the gas drawn in;

FIG. 5 is a block connection diagram of a prior art compressor installation;

FIG. 6 is a block connection diagram of an inventive compressor installation;

FIG. 7 is a diagram of the power demand of the compressor installation illustrated in FIGS. 5 and 6;

FIG. 8 is a diagram of the gas volume during compression by means of the compressor installations illustrated in FIGS. 5 and 6;

FIG. 9 is the pressure graph of the gas during compression by means of the compressor installation illustrated in FIGS. 5 and 6;

FIG. 10 is the temperature graph of the gas during compression by means of the compressor installation illustrated in FIGS. 5 and 6;

DETAILED DESCRIPTION OF PREFERRED EMBODIMENTS

Figure 1:
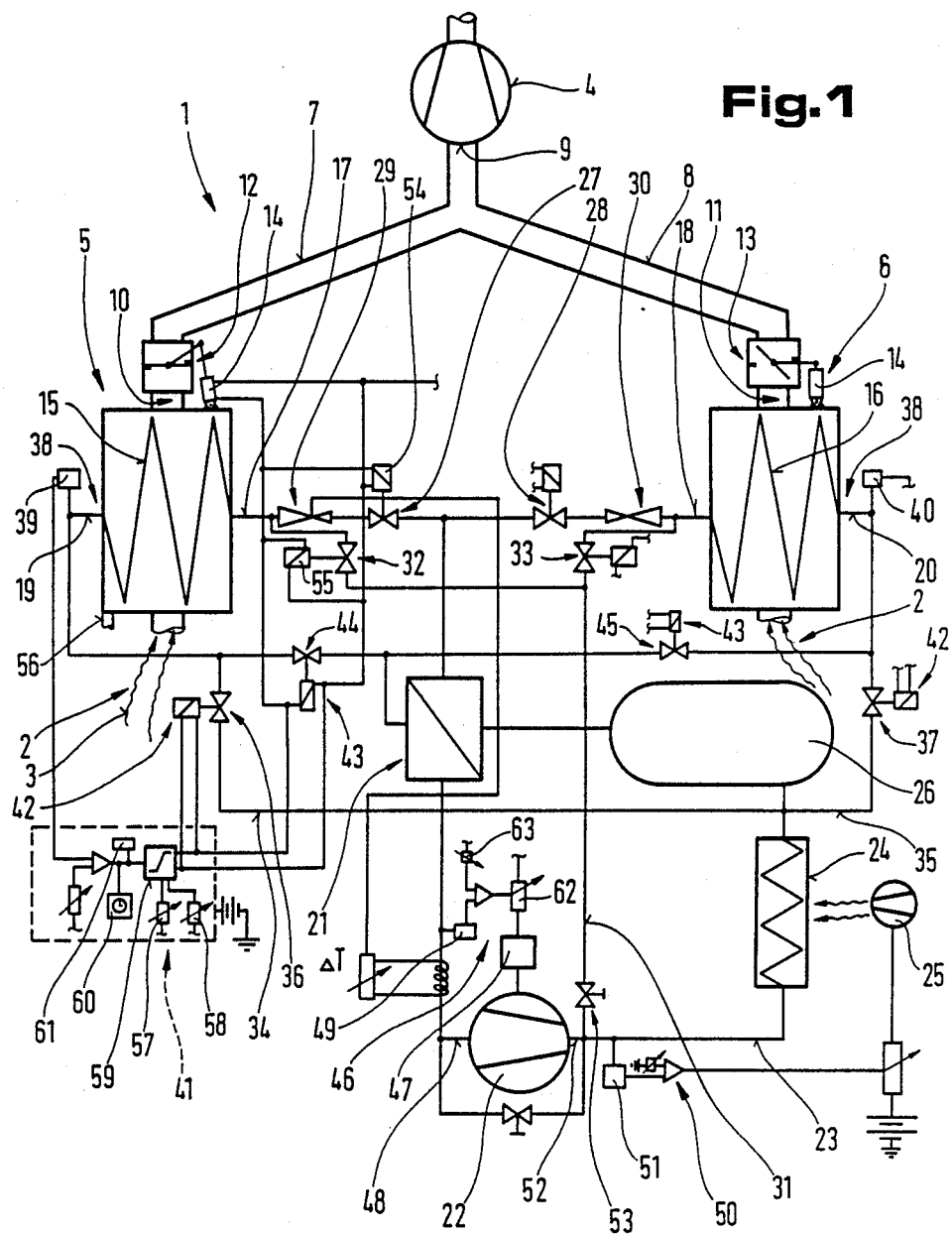
FIG. 1 is a block connection diagram of a device according to the invention for compression of gases, comprising two freeze-dehumidifiers arranged parallel to each other and a hot-gas defrosting operation.

FIG. 1 shows a device 1 for compression of gases 2—denoted diagrammatically by arrows 3. This comprises a compressor 4, for which purpose use may be made of fan compressors, as well as of piston compressors or radial flow compressors, and two freeze-dehumidifiers 5,6 preceding the compressor 4. The two dehumidifiers 5,6 are connected via suction pipes 7,8 to a suction-side intake 9 of the compressor 4. Between an outlet 10,11 of the dehumidifiers 5,6 and the suction pipes 7,8 are situated airtight closing valves 12,13 which may be shifted by means of drives 14, e.g. piston-cylinder systems or electromagnet systems, from the closed position shown in the case of the closing valve 12, into the open position shown in the case of the closing valve 13. A heat exchanger 15,16 is situated in each freeze-dehumidifier 5,6. Each heat exchanger 15,16 is connected to a pressure pipe 17,18 and a suction pipe 19,20 respectively of a refrigerant circuit. The gaseous refrigerant coming from the heat exchanger 15,16 in the suction pipes 19,20 is drawn a refrigerant compressor 22 through heat exchanger 21. The gaseous refrigerant is compressed in the refrigerant compressor 22 and is fed via a pipe 23 to a condenser 24 in which so much thermal energy is drawn from the refrigerant that it passes from the gaseous into the liquid state. The cooling action may be performed by means of air or liquid for this purpose, a blower 25 being shown in the example illustrated, by means of which air is blown through the condenser 24 for undercooling of the refrigerant gas. The liquefied refrigerant gas is then fed to a liquid tank 26 and supplied on demand to the pressure pipes 17,18 and thus to the inlets of the heat exchangers 15,16 via the heat exchanger 21, control valves 27,28 and expansion valves 29,30 respectively, in which the liquid refrigerant is atomised and converted into the gaseous state. A by-pass pipe 31 which is coupled to the pressure pipes 17,18 via valves 32,33 is provided between the pressure pipes 17 and 18 respectively and the pipe 23.

Branch pipes 34 and 35 respectively, which lead into the pipe 23 between the condenser 24 and the liquid gas tank 26 under interpositioning of check valves 36,37, e.g. such as non-return valves, branch off from the suction pipes 19,20 before the heat exchanger 21. Each suction pipe 19,20 has a temperature and/or pressure measuring device 39,40 in the area of an outlet 38 from the heat exchanger 15,16. These measuring devices 39,40 are coupled via a control device 41 in each case—of which only that allocated to the measuring device 39 is shown, that allocated to the measuring device 40 being liable to be formed identically —to the drives 42,43 such as electromagnets for example, for the non-return valves 36,37 and for valves 44,45 situated in the suction pipes 19 and 20 respectively, between the branching-off of the branch pipes 34,35 and the heat exchanger 21. Another control device 46 serves the purpose of controlling a driving motor 47 of the refrigerant compressor 22 whereof the operation is controlled or governed as a function of a temperature and/or pressure measuring device 49 arranged before a suction pipe stub 48.

The delivery volume of the blower 25 for the condenser 24 is governed as a function of a control means 50 which comprises a temperature and/or pressure measuring device 51, which is installed in the pipe 23 between a pressure outlet 52 of the refrigerant compressor and the condenser 24. The control devices 41,46,50 jointly form a control system.

A pressure regulator valve 53 is situated between a branch of the by-pass pipe 31 from the pressure pipe 23 and the valves 32,33. Instead of incorporating a pressure regulator valve 53 in the by-pass pipe 31, it is also possible to form the by-pass pipe 31 with a smaller cross-section compared to the pipe 23, so that a "lot" of hot refrigerant gas intended to be fed to the by-pass pipe may be obtained thereby.

The method for compression of gases according to the invention now takes the following course:

The gas 2 which is to be compressed is drawn in, in the case of the device 1 shown in FIG. 1, via the freeze-dehumidifier 6, the opened closing valve 13, the suction pipe 8 and the inlet 9 of the compressor 4, and is compressed to the degree required in the compressor 4. The gas drawn in concomitantly traverses the heat exchanger 16 in the dehumidifier 6. This heat exchanger 16 is situated in a refrigerant circuit or loop, to cool the gas 2 drawn in. When the heat exchanger 16 is being traversed by the refrigerant vapour, it draws heat from the heat exchanger, so that the refrigerant remains in the gaseous condition. To assure that this gaseous condition is retained as far as the suction pipe stub 48 of the refrigerant compressor 22, the refrigerant vapour may be ducted through the complementary heat exchanger 21 in which more heat is drawn from the liquid refrigerant fed to the pressure pipe 18. The gaseous refrigerant highly compressed by the refrigerant compressor 22 is placed in the liquid state by means of the condenser 24 and placed in intermediate storage in the liquid gas tank 26. From the latter it reaches the pressure pipe 18 of the heat exchanger 16 via the heat exchanger 21, the control valve 28 and the expansion valve 30. Whilst the gas 2 drawn in is being cooled in the freeze-dehumidifier 6 and fed in cooled form to the compressor 4, the pressure pipe 17 of the heat exchanger 15 has fed to it hot gaseous refrigerant via the by-pass pipe 31 and the valve 32. The gastight closing valve 12 is closed during this delivery of hot refrigerant vapour into the heat exchanger 15 because the thawing of the ice coating deposited on the heat exchanger 15 engenders a mist which is water-saturated, and if the closing valve 12 were to lack a gastight construction, this mist could penetrate into the suction pipe 7 and thus into the compressor 4, thereby preventing the desirable drying action on the gas 2 drawn in. The ice coating is formed on the heat exchangers 15 and 16 because the humidity contained in the gas is separated by the undercooling of the gas drawn in and is frozen solid on the heat exchangers 15 and 16 because of the sub-zero temperatures in their area. Since an ice coating of this kind exercises a powerful insulating action, a state is reached after a definite period of operation, in which the heat absorption of the refrigerant in the heat exchangers 15 and 16 is no longer adequate to assure the desirable undercooling of the gas drawn in. This is monitored while the heat exchanger 16 is in operation in such manner that the pressure of the refrigerant is monitored in the area of the suction pipes 19,20, after leaving the heat exchangers 15 and 16 respectively, by means of the pressure and temperature measuring devices 39 and 40. If the pressure of the gaseous refrigerant coming from the heat exchangers 15,16, is too low, i.e. if too little heat had been drawn from the refrigerant in the heat exchangers 15,16 because of the insulating action of the ice coating, the gastight valve 12 is closed via the control device 41 as shown diagrammatically in respect of the freeze-dehumidifier 5, and a drive 54 of the control valve 27 is acted upon so that the supply of liquid refrigerants from the liquid gas tank 26 to the pressure pipe 17 is interrupted. A drive 55 of the valve 32 is then acted upon by the control device 41 so that the by-pass pipe 31 is connected to the pressure pipe 17. At the same time, a drive 43 of the valve 44 is so acted upon that the connection between the suction pipe 19 and the heat exchanger 21 is interrupted. Following this, the drive 42 is acted upon and the closing valve 36 is opened, so that a communication is established between the suction pipe 19 and the branch pipe 34. A partial flow of the hot refrigerant vapour then passes into the pressure pipe 17 whilst by-passing the expansion valve, via the by-pass pipe 31 according to the setting of the pressure regulator valve 53 or via the smaller cross-section of the by-pass pipe 31 compared to the pipe 23, and into the heat exchanger 15. The heat exchanger 15 is heated thereby and the ice frozen to the heat exchanger melts and runs in the form of water via a drainpipe 56 outwards from the freeze-dehumidifier 5. During this time, the heat exchanger 16 is acted upon and cooled by a gaseous refrigerant via the expansion valve 30, so that the gas 2 drawn in is cooled before entering the suction pipe 8 by approximately 40° C. to the required temperature of approximately −20° C., in the case of an intake temperature of 20° before the freeze-dehumidifier. Because no more than a part of the quantity of hot refrigerant vapour is derived from the pressure outlet 52 of the refrigerant compressor 22, it is possible to perform the defrosting of the heat exchanger 15 or 16 which is iced up at the time with but little more power than needed for the cooling of the gas 2 which is to be drawn in, thanks to the arrangement of the refrigerant compressor 22. Since the period lasting until the heat exchanger 15 or 16 utilised for undercooling of the gas 2 drawn in is iced up to such an extent that the cooling effect required for undercooling of the gas drawn in is no longer adequate is available in each case for the defrosting stage, it is possible to manage on a partial flow of the hot refrigerant vapour. Another advantage of this solution consists in that the refrigerant utilised for the hot-gas defrosting operation is not fed to the suction pipe stub 48 of the refrigerant compressor 22 after flowing through the heat exchanger 15, but to the inlet of the liquid gas tank 26. As a matter of fact, it was observed that following the hot-gas defrosting of the heat exchangers 15 or 16 respectively, the pressure and thus the condition of the refrigerant in the suction pipe 19 or 20 or in the branch pipe 34 corresponds to the same condition of the refrigerant as that prevailing in the pipe between the condenser 24 and the liquid gas tank 26.

It is consequently possible to omit complex interpositionings of protective means, e.g. liquid separators, which are required if this refrigerant coming from the hot-gas defrosting operation had to be fed direct to the suction pipe stub 48 of the refrigerant compressor 22 for the refrigerant. As a matter of fact, the liquid refrigerant would have to be prevented from being drawn into the compressor in this case, to avoid liquid hammer and thus damage to the refrigerant compressor 22. The efficiency of the whole compression system for the gas is raised moreover, since the refrigerant utilised for the hot-gas defrosting operation may be co-opted direct for undercooling of the gas drawn in, in the other heat exchanger.

The initiation of the controlling operation for switching from the cooling stage into the defrosting stage is obtained by the fact that parameters corresponding to the momentarily required pressures of the refrigerant in the suction pipe 19 are preset via setting elements 57 and 58 for a threshold value switch 59, so that the previously described switching-over of the individual valves as well as the opening and closing of the gastight closing valve 12 or 13 may be performed thereby. It is also possible under particular circumstances to associate the control means 41 with a timer switch 60 by means of which the defrosting stage is terminated. The control means 41 indicated by pecked lines may furthermore also comprise a program memory 61 or a corresponding analog or digital sequential control device which operates the successive switching of the drives for the valves or closing valves 12,13 and the like. It is essential in this connection that the closing valve 12 or 13 is reliably closed prior to initiation of the defrosting operation and that it is not opened until the defrosting operation is completed. To this end, it is advantageous if the heat exchanger 15 is acted upon by refrigerant after completion of the defrosting operation via the control valve 27 and the expansion valve 29, so that the heat exchanger is precooled after the defrosting operation to prevent an excessive proportion of humidity from being entrained into the compressor with the gas 2 drawn in, after opening the closing valve 12 following the defrosting operation.

It is advantageous if care is applied during the defrosting operation to ensure that the surface of the heat exchanger remains damp, i.e. that the defrosting operation is completed before the heat exchanger surface dries off completely, so that the cleaning action by retention of the solids contained in the gas drawn in on the damp surface of the heat exchanger is also assured whilst drawing in the gas immediately following the defrosting operation.

A control device corresponding to the control means 41 is also allocated to the closing valve 13 and to the valves and control valves or their drives, which are associated with the heat exchanger 16.

The control device 46, which is also shown diagrammatically, serves the purpose of controlling the performance of the refrigerant compressor 22 for the refrigerant according to the prevailing quantities in the refrigerant circuit. For example, if the volume of the gas 2 drawn in is reduced because of a lower performance of the compressor 4, e.g. predicated by a lesser demand for compressed gas 2, a lesser frigorific performance will also be needed to cool the smaller volume of gas drawn in. So that an unnecessary expenditure of energy or excessive chilling of the gas drawn in may now be prevented, the output of the driving motor 47 for the refrigerant compressor 22 is governed via a regulator 62 based on the pressure—and the temperature values derived therefrom—in the pipe preceding the suction pipe stub 48 of the refrigerant compressor 22. Appropriate setting units 63 are also provided in this control device 46, to allow for establishing the required limiting values for the regulator circuit.

The control device 50 acts to control the blowers 25 for the condenser 24. In this case too, the pressure and temperature evolution of the refrigerant are monitored in the pipe 23 by means of a measuring device 51, and the volume of air required to cool the refrigerant in the condenser 24 is controlled via the output of the blower 25 depending in each case on the prevailing quantities based on the performance figure of the refrigerant compressor 22. The control devices 46 and 50 may obviously be organised according to the most diverse forms of construction known in the prior art, e.g. such as an analog/digital control system, or a microprocessor control system, or the like. Instead of air, it is also possible to make use of a liquid, for example water, for cooling the refrigerant, to which end and by analogy to the governing of the blower 25, the output of the pumps conveying the liquid or rather the quantity of water led through the condenser 24, may then be governed accordingly by means of the control device 50.

Furthermore, the refrigerant compressor 22 has allocated to it a by-pass pipe which extends between the suction pipe stub 48 and the pipe 23. An underpressure and overpressure control valve is situated in this pipe to prevent damage to the refrigerant compressor. As shown diagrammatically in the area right before the suction pipe stub 48 in the pipe between the suction pipe stub and the heat exchanger 21, this pipe may have associated with it a temperature sensor which detects the temperature of the refrigerant in this pipe and correspondingly controls the expansion valves 29 and 30 respectively in manner known per se, so that more or less liquid gas of the refrigerant is gasified in the expansion valve to allow maintenance of the prevailing quantities constant in the refrigerant circuit and so that the intake temperature of the gas which is to be compressed retains the required value.

Figure 2:
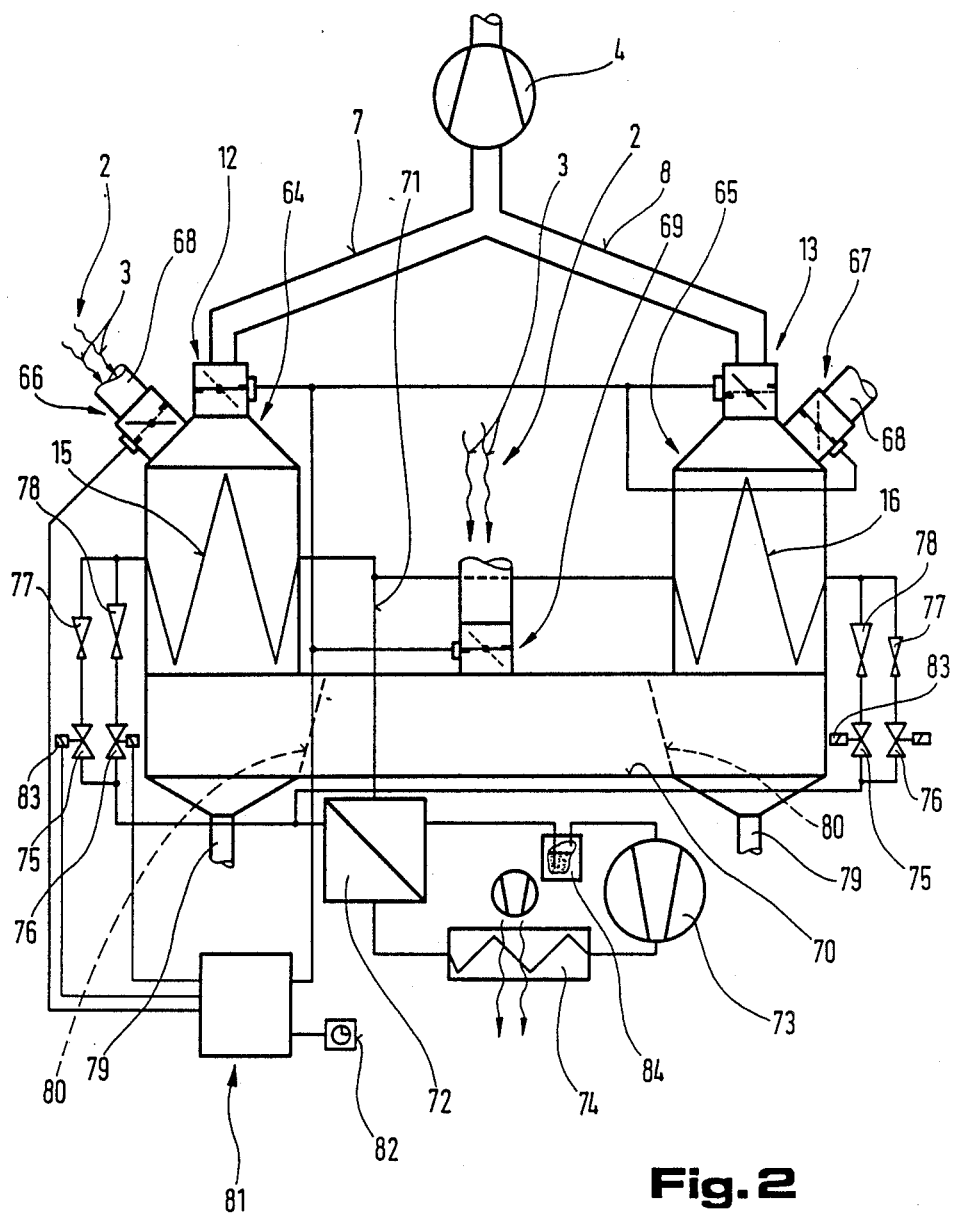

FIG. 2 depicts an inventive device for compression of a gas 2—which is again indicated diagrammatically by arrows 3. The compressor 4 for this gas is preceded by two freeze-dehumidifiers 64,65 for cooling the gas 2 drawn in. Gastight closing valves 12 and 13 constructed in accordance with the closing valves 12,13 depicted in FIG. 1, are situated between the dehumidifiers 64,65 and the suction pipes 7,8 leading to the compressor 4. These dehumidifiers 64,65 complementarily have other closing valves 66,67 which are gastight in the closed state at least to entry of gases from the direction of the suction pipe stub 68. The same applies regarding a closing valve 69 which is situated in a connecting pipe 70. This connecting pipe connects openings of the dehumidifiers 64,65 oppositely situated to the closing valves 12 and 13. The dehumidifiers 64,65 have arranged in them heat exchangers 15,16 which form a circuit for a refrigerant together with a suction pipe 71, a heat exchanger 72, a refrigerant compressor 73 for the refrigerant, a condenser 74 and control valves 75,76 as well as expansion valves 77,78. So that the icingup of the heat exchangers 15 and 16, respectively, which occurs after some time, may now be eliminated as already described under reference to FIG. 1, use is now made of the gas 2 drawn in and not of the hot gaseous refrigerant coming from the refrigerant compressor 73. A method of this nature for the defrosting of the heat exchangers 15,16 by means of the gas drawn in is obviously possible only if the gas 2 drawn in has a temperature exceeding 0° C.

In the inventive method for undercooling of the gas 2 drawn in under application of the device shown in FIG. 2, the gas which is to be compressed is drawn in to the compressor 4 for the gas 2, via the opened closing valve 66, the heat exchanger 15, the connecting pipe 70, the heat exchanger 16 and the opened closing valve 13 as well as the suction pipe 8. If the heat exchanger 15 had previously been utilised for undercooling the gas drawn in, the latter is now traversed by flow against the direction of the gas drawn in, that is from the closing valve 66 in the direction of the connecting pipe 70, the ice present on the heat exchanger 15 being melted by the warm gas 2 drawn in flowing along the said heat exchanger and removed from the area of the freeze-dehumidifier 64 via a drain 79. A filter 80 may be installed after the heat exchanger 15 to retain a large proportion of liquid from the gas flowing through. The gas drawn in then passes through the connecting pipe 70 and is undercooled to the required temperature by the heat exchanger 16 before entering the suction pipe 8. The induction of the gas 2 which is to be compressed, occurring in the manner described in the foregoing, is maintained until the ice has been melted from the heat exchanger 15. This monitoring operation is performed by means of a control device 81, the period required to defrost the heat exchanger 15 with the gas drawn in commonly being determined by preliminary tests. This period required for defrosting may be preset at the level of the control system 81 by means of a timer switch 82. After this period has elapsed, the closing valve 69 is opened and the closing valve 66 is closed, so that the gas 2 to be compressed is then drawn by suction to the heat exchanger 16 via the closing valve 69 and the connecting pipe 70 and supplied to the compressor 4 via the closing valve 13 and the suction pipe 8. Simultaneously with the closing of the closing valve 66, the control valve 75 is opened by means of an associated drive 83 and acted upon by the control system 81, and a part-flow of the refrigerant provided for undercooling is fed to the heat exchanger 15. As indicated diagrammatically by the size of the expansion valve 77, this pipe extending parallel to the control valve 76 and expansion valve 78 has a smaller cross-section, or the same is connected via a reduction valve to the pipe coming from the heat exchanger 72, so that the greater proportion of the refrigerant coming from the refrigerant compressor 73 is retained for the heat exchanger 16 cooling the gas which is to be cooled. The heat exchanger 15 is now pre-iced with this part of the refrigerant quantity during a specific period or as described with reference to the example of embodiment of the device in FIG. 1 under monitoring of the pressure conditions or temperature evolution of the refrigerant, until the temperature required for the cooling of the gas drawn in is reached at the heat exchanger. Once this temperature is reached, or the period required for this purpose has elapsed, the control system 81 opens the closing valve 12 and immediately thereafter or at the same time, closes the closing valve 13 in the area of the freeze-dehumidifier 65. The gas 2 which is to be compressed is now drawn in via the closing valve 69. The closing valve or flap 67 is thereupon opened and the closing flap or hinged flap 69 is closed, so that the gas which is to be compressed is then drawn in via the suction pipe stub 68, the hinged flap 67, the heat exchanger 16 and the connecting pipe 70, is finally chilled in the heat exchanger 15 and concomitantly dehumidified, and then fed to the intake pipe 7 of the compressor 4. Before thereupon opening the hinged flap 12 and closing the hinged flap 13, the control valve 75 allocated to the heat exchanger 15 is closed moreover via the control system 81 and the control valve 76 is opened, so that the greater proportion of the refrigerant flow is allocated to the heat exchanger 15, whereas the control valve 76 is closed and the control valve 75 remains closed in the case of the heat exchanger 16. The control valves 75,76 remain closed until a period preset by the timer switch 82 has elapsed, or the heat exchanger 16 has been defrosted, whereupon the heat exchanger 16 is prechilled by opening the control valve 75 as already described with reference to the heat exchanger 15.

The advantage of this solution consists in that the defrosting operation is performed by the gas to be drawn in by suction, and that the energy needed for defrosting the heat exchanger 15 or 16 is not lost but is utilised for precooling of the gas drawn in. The energy required for defrosting is consequently drawn direct from the gas drawn in, thereby securing an essentially desirable precooling action on the gas, whilst simultaneously obtaining the defrosting action. The heat exchanger 16 may consequently also operate with a little less power than if the gas to be compressed is drawn in via the hinged flap 69, that is without precooling, at least during the periods in which the heat exchanger of the other dehumidifier is still provided with an ice coating.

It is emphasised that a filter 80 may also be installed between the inlet of the heat exchanger 16 and the hinged flap 69 . The control system 81 is also so constructed that the hinged flap 13 and 67 and the expansion valves 77,78 preceding the heat exchanger 16 or the drives 83, may be controlled.

A control device known in the prior art, such as described in connection with FIG. 1 is preferentially also utilised to govern the aperture cross-section or the throughflow volume in the expansion valves 77 and 78.

So that a so-called "water-hammer" may be prevented in the area of the refrigerant compressor 73, a so-called liquid separator 84 is situated between the heat exchanger 72 and the refrigerant compressor 73. This comprises a container into which the pipe coming from the heat exchanger 72 leads at the lowest possible point, whereas the pipe leading to the suction pipe stub of the refrigerant compressor 73 departs from the highest point of the container, so that liquid refrigerant coming from the heat exchanger 72 collects on the bottom of this container and that gaseous refrigerant only may be drawn in by the suction pipe stub of the refrigerant compressor 73. The refrigerant present in the liquid separator 84 vapourises by withdrawal of heat from the gaseous refrigerant flowing past in the same, or by heat withdrawal from the atmosphere surrounding the container, and may again be fed to the refrigerant compressor 73 for compression. The incorporation of two expansion valves coupled in parallel for different throughflow volumes may also be applied for supplying the heat exchangers 15 and 16 in FIG. 1, for example so that these may equally be prechilled after their defrosting, before the gas drawn in is again led through the defrosted freeze-dehumidifier 5 or 6. The control device may be operated under application of optional control members. It is thus possible to replace a purely analog signal processing system comprising a relay circuit by a digital signal processing system comprising microprocessors and the like. The drives for the hinged flaps 12,13,66,67 and 69 may for example be formed by compressed air cylinders, but also by other pressure fluid cylinders or electric servo-motors. The incorporation of a heat exchanger 72 in the refrigerant circuit is also merely optional. Water may also be utilised instead of air to cool the refrigerant in the condenser 74.

Figure 3:
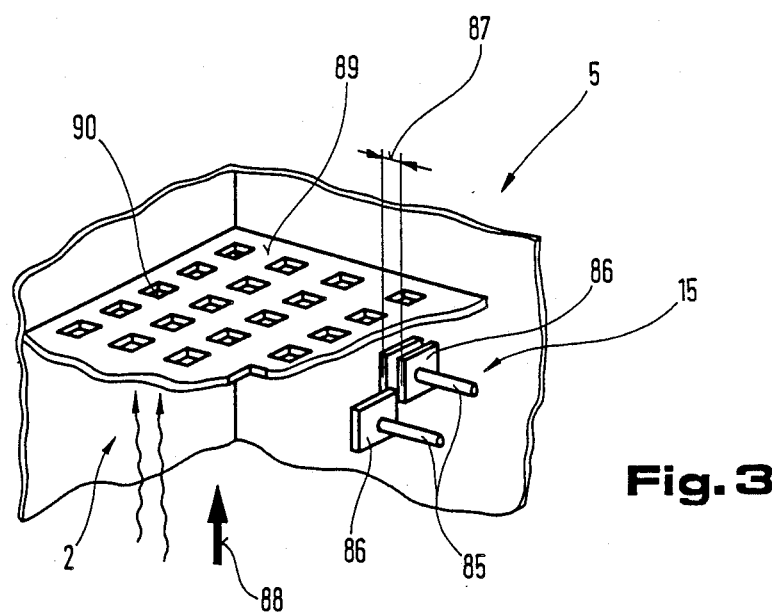
FIG. 3 is a fragmentary section of a part of a freeze-dehumidifier.

FIG. 3 illustrates a part of a freeze-dehumidifier 5, the dehumidifiers 6 or 64, and 65 respectively, suitably being identically constructed. The dehumidifier 5 has ducting pipes 85 of the heat exchanger 15 installed in it, which bear fins or gills 86 for improved heat transfer. As apparent, the gills of a ducting pipe 85 are spaced apart from each other in the longitudinal direction of the ducting pipe, so far that at least a corner portion of another gill of a directly adjacent ducting pipe 85 engages between them. The gills 86 of a ducting pipe 85 have a spacing 87 at right angles to the throughflow direction of the gas 2 denoted by an arrow 88, which amounts to at least 4 mms and at most 10 mms. An air deflector plate 89 is situated between the heat exchanger 15 and the gastight hinged flap 12. Openings 90 are provided in this air deflector plate 89, being uniformly spread over its surface, the sum of the openings amounting to say 50% of an overall aperture cross-section of the dehumidifier 5. It is accomplished by utilisation of the air deflector plate 89 that an identical throughflow velocity arises throughout the cross-section of the heat exchangers 15 and 16 respectively, and that the disadvantages of the suction taper may consequently be reduced. Thanks to the uniform suction velocity throughout the heat exchanger cross-section, use may be made of the whole heat exchanger surface for cooling the gas drawn in.

Because the cross-section of the freeze-dehumidifier or rather the throughflow cross-section through the heat exchangers 15 and 16 is so dimensioned that the speed of gas drawn in amounts to 0.6 to 1.3 m/sec in the suction area leading to the heat exchangers 15 and 16 respectively, an intake speed of such magnitude as to allow several small water or dirt molecules to combine into a larger molecule, thereby causing an improved separation of humidity and dirt in the area of the heat exchanger or in the area of the air deflector plate 89 following the same, is reached in conjuction with the reduction of the flow arrival speed based on the cooling of the gas in the area of the heat exchangers 15 or 16 respectively.

Figure 4:
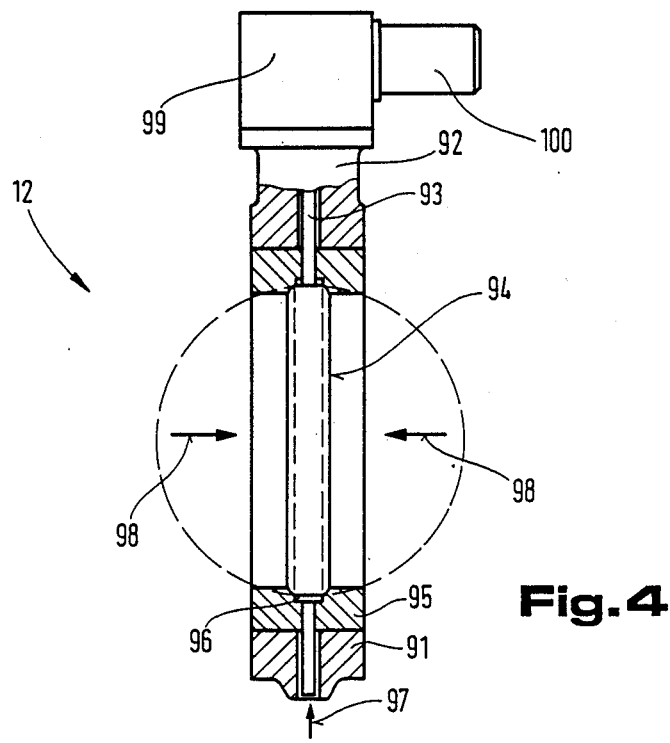
FIG. 4 is a fragmentary partly sectional side elevation of an airtight closing valve.

FIG. 4 shows a gastight hinged flap 12 incorporating a disc-like carrying member 91 which has a stub 92 formed integrally with it, which houses a pivot spindle 93 for a closing flap 94. The carrying member 91 has a sealing ring 95 installed in it, which is provided with a groove 96 at the side facing towards the closing flap 94. If the closing flap 94 is then pivoted from the open position—shown by dashed lines—into the closed position illustrated by solid lines, the sealing ring 95 is deformed correspondingly and represents a gastight seal in the direction of the pivot spindle 93—arrow 97—and in both directions of flow indicated by arrows 98. A satisfactory seal is obtained by virtue of the groove 96 throughout the periphery of the closing flap 94, thanks to the elasticity of the sealing ring 95. Ice adhering in the area between the sealing ring 95 and the closing flap 94 is also spalled off by means of a sufficiently great displacing force. The pivot spindle 93 may be coupled via an angle drive 99 to a drive 100 which may for example be formed by a lead screw and moving nut system comprising an electric driving motor.

The gastight closing flap 12 described is one of the possible modified forms for embodiment of the inventive device. The invention is not however restricted to this form of embodiment as described, and use may be made of any optional closure means which in the closed state prevent a passage of gases in at least one direction of flow or in both directions of flow indicated by the arrows 98 in FIG. 4 in the case of the closing flaps 12 and 13.

A device for compression of gases 2, which is conventional and disclosed in the prior art, is shown in FIG. 5 as a block connection diagram. A device of this kind comprises a suction filter 101, a compressor 102, an aftercooler 103, a cyclone separator 104 and a freeze-dehumidifier 105. All these devices post-connected to the compressor are necessary to obtain an adequate compression dewpoint, so that a condensation of the humidity contained in the compressed gas and thus a precipitation of liquid in the pipes may be prevented during the ducting of the compressed gas, above all in branched systems, e.g. as in the case of compressed air supply systems. It is shown in FIG. 6 that no more than one freeze-dehumidifier system 106 and a compressor 102 are required in the inventive device 1, instead of the device parts shown in FIG. 5, in the case of a compression of the gas by 6 bat for example.

The coincidental illustration of the block connection diagrams of the device as per the prior art in FIG. 5 and according to the invention in FIG. 6 occurs so that differences in power consumption against gas volume and pressure evolution as well as the advantages and savings obtainable with the inventive method may be illustrated more satisfactorily under reference to the diagrams shown in FIGS. 7 to 10.

A comparison is shown in FIG. 7 between the systems shown in FIGS. 5 and 6, the dash-dotted line in the graph showing the values for the system according to FIG. 5 and the solid line showing the values for the system according to FIG. 6. The power demand is related to 1 m³ of compressed gas, for example air, under a compression of 7.5 bar.

As apparent the freeze-dehumidifying system 106 of the inventive device 1 requires a greater power demand than the suction filter 101 in the known device. Distinct differences then already become apparent however in the case of the power demand of the compressor 102 since, as apparent from FIG. 8, the air has to be compressed to over 8 bar to secure the required 7.5 bar of overpressure at the outlet of the compression plant—after the dehumidifier in the embodiment according to FIG. 5. The additional small increase in power demand then arise for the cyclone and the freeze-dehumidifier to obtain the required compression dewpoint of 25° C. in the case of compressed air supply systems, in internal volumes.

It should be observed in this connection that the pressure drops constantly from the outlet of the compressor onward, because of the flow resistance factors in the aftercooler and in the cyclone as well as in the dehumidifier. This has a close correlation with the temperature evolution which is apparent from FIG. 9. Whereas the suction temperature remains identical in the suction filter in the system as per the prior art, it rises to say 80° C. in the compressor because of the higher suction temperature and is cooled down very intensively twice in the aftercooler as well as in the dehumidifier, to separate the humidity contained in the gas or air drawn in by suction. The double aftercooling of the compressed gas however causes a reduction of the air volume, as apparent from FIG. 10 in particular, compared to the inventive device according to FIGS. 1 and 2 or 6, in which the air volume remains practically unchanged or identical after the compressor, since the required volume of 100% is equally present at the suction pipe stub of the compressor in view of the preliminary drying action in which a greater air volume is drawn in thanks to the undercooling action, whereas a compressed air volume of say 120% is present at the pressure outlet of the compressor in the inventive device according to FIG. 6, with the required temperature evolution. This volumetric advantage is primarily connected with the fact that the air already dried in the course of induction by suction or the dried gas may be delivered onwards to further processing stages direct from the compressor at its outlet temperature, whereas an aftercooling stage is needed in the known system according to FIG. 5 to obtain a corresponding compression dewpoint.

The sum of advantages of the inventive method as well as of the application of the inventive device according to FIG. 6 is obtained in this connection, especially because of the lesser power demand and of the greater gas volume available to the consumer, as apparent particularly clearly from FIGS. 7 and 10.

An evaluation of the graphs shown in FIGS. 7 to 10 shows that in view of the greater air volume under application of the inventive systems or inventive methods, it is possible to manage with one compressor which has a smaller power demand than in the known method, since apart from a reduced power absorption during compression, it is also possible to reduce the discharge volume of the compressor by the proportion in % to which a greater air volume is available at the consumer side, as apparent in particular from FIG. 10. The power demand and the air volume of a system of this nature incurring a lesser power absorption, are apparent from the graphs plotted in dash-dotted lines in FIGS. 7 and 10.

It should be considered in this connection that favourable results are obtained upon application of the inventive method or device if the temperature differential between the suction intake temperature at the freeze-dehumidifying system and the suction intake temperature at the suction pipe stub of the compressor amounts to say 40° C. A complementary advantage of the dehumidifying system consists in that the ice coating on the freeze-dehumidifier simultaneously acts as a suction filter and that the losses occurring in the suction filter in known compression systems are thus also eliminated.

It is essential for the present invention that an undercooled and dehumidified or purified gas is present at the suction pipe stub of the compressor 4 thanks to the combination of the freeze-dehumidifiers connected in parallel under utilisation of airtight flaps and to the predescribed process sequences. Thanks to the subsequent defrosting of the dehumidifiers, the accumulating contaminations in the ice coating formed on the heat exchangers 15 and 16 respectively by the humidity drawn from the gas, are removed and withdrawn together with the water.

The freeze-dehumidifiers utilised on conjunction with the inventive method or device are evidently not restricted to the possibilities of embodiment shown in the examples of embodiment, and it is possible to install any optional cooling device in these cooling channels receiving the dehumidifiers, to secure chilling of the gas drawn in.

The drives or control devices and systems, respectively, are suitably connected to energy sources for their operation.

Figure 11:
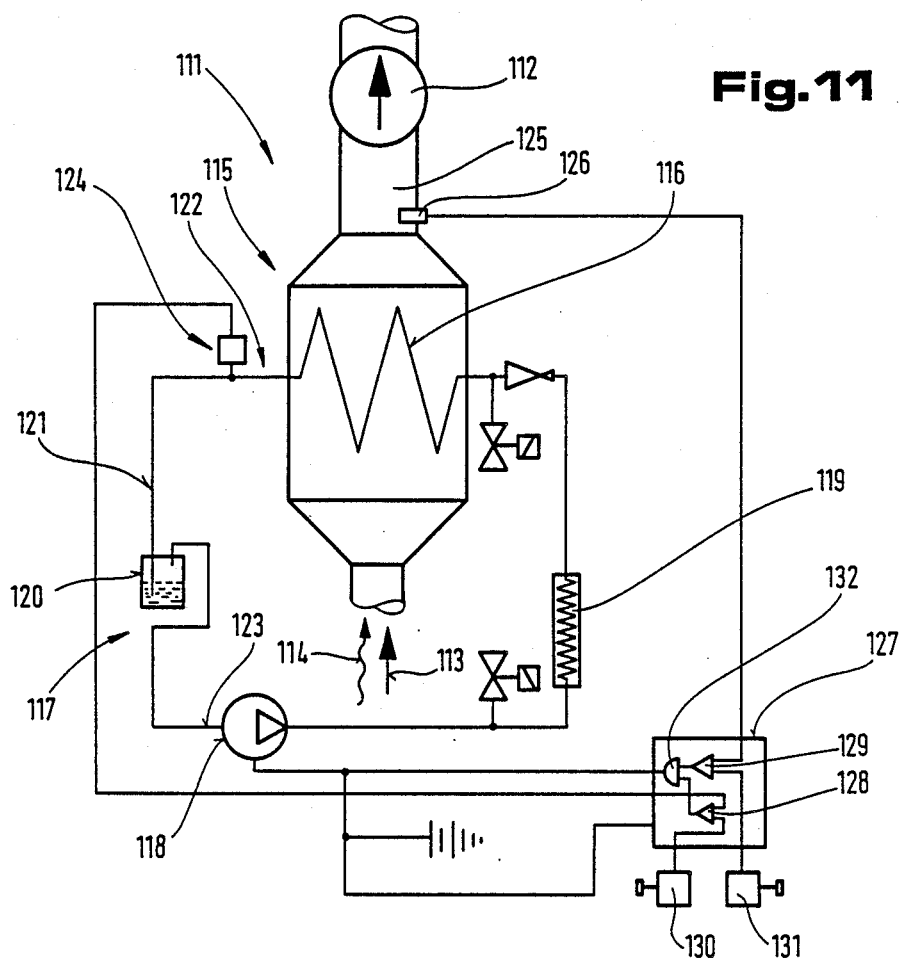
FIG. 11 is a block connection diagram of a device for inventive compression of gases.

FIG. 11 illustrates a device 111 for compression of gases according to the inventive method. This comprises a compressor 112 and preceding the same in the direction of intake by suction of the gas 114 to be compressed—arrow 113—shown diagrammatically by selected arrows, a freeze-dehumidifier 115. The dehumidifier 115 has arranged in it a heat exchanger 116 situated in a refrigerant circuit 117 which comprises a refrigerant compressor 118, a condenser 119 and a liquid separator 120. A pressure metering device 124 is installed in a suction pipe 121 running from the outlet 122 of the heat exchanger 116 to the suction pipe stub 123 of the refrigerant compressor 118. A temperature gauge 126 is installed in the area of the suction pipe 125 following the heat exchanger 116 and running to the compressor 112. The output of the pressure measuring device 124 as well as of temperature gauge 126 are connected to a control system 127 through which the drive to the refrigerant compressor 118 is controlled. The control system 127 comprises governor units 128 and 129 whereof the input sides in each case receive the signal wires of the pressure measuring device 124 and of the temperature gauge 126, respectively. Furthermore, these governor units 128 and 129 have allocated to them respective setting members 130 and 131, e.g. under application of an analog control system 127 a regulating potentiometer, and the prevailing differential value is ducted onwards to an AND member 132 via connecting wires. If the measuring values preselected by means of the setting members 130 and 131 are reached, the drive to the refrigerant compressor 118 is stopped and the operation of the refrigerant circuit 117 is interrupted. The condensate frozen solid on the heat exchanger because of its low temperature is melted by the warm gas drawn in too by the compressor, and may drain off. If a pressure corresponding to a positive temperature of the refrigerant in the area of the heat exchanger 116 is detected by the pressure measuring device 124 in the suction pipe 121 of the refrigerant circuit 117, a signal is transmitted from the regulator unit 128 to the AND member 132. If a signal input is then also extant from the regulator unit 129 because the required gas temperature is reached in the area of the temperature gauge 126, the refrigerant compressor 118 is switched on again and the refrigerant circuit 117 is energised. This immediately performs an undercooling of the heat exchanger 116 and a cooling action on the suction air until the ice coating on the heat exchanger 116 is so thick that its insulating action no longer allows of appropriate chilling of the gas drawn in. This condition is detected by the temperature gauge 126 on the one hand and on the other hand by the pressure evolution in the suction pipe 121 of the refrigerant, since the withdrawal of heat from the refrigerant is no longer available under excessive insulating action of the ice coating.

The control system described may evidently also be so constructed that a complete regulator circuit is present, so that the performance of the refrigerant compressor 118 is steplessly adapted in each case to the required frigorific energy in the area of the heat exchanger 116. The setting elements 130 and 131 may also be provided with several setting members to establish the two nominal conditions in each case in which operation of the refrigerant compressor 118 should be reduced or terminated, and in which the operation of the same should be enhanced or initiated.

Figure 12:
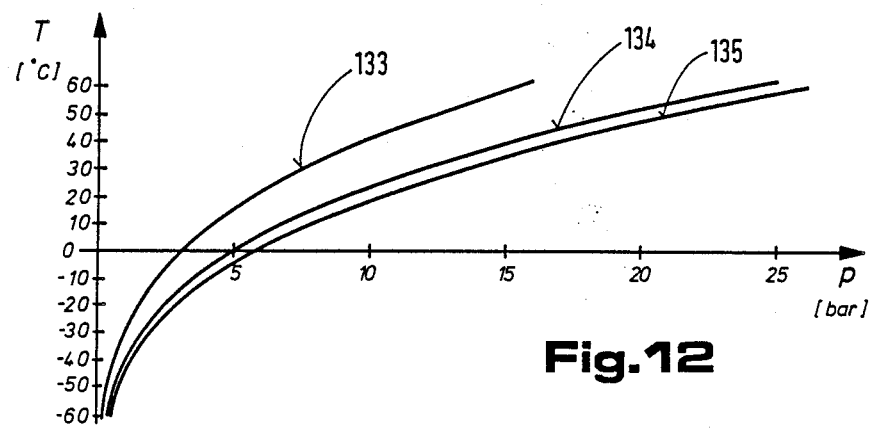
FIG. 12 is a diagram illustrating the relationship between the refrigerant pressure and the temperature of the refrigerant and thus the surfaces of the heat exchanger.

The temperature and pressure characteristics of some current refrigerants are shown in FIG. 12 to allow of improved illustration of the connections between the pressure of the refrigerant and the prevailing temperature of the refrigerant. A characteristic 133 thus shows the connections between temperature and pressure for a freon 12, whereas a characteristic 134 shows the same ratio for freon 22 and one characteristic 135 for freon 502.

It is apparent from these graphs that in the case of freon 12, a pressure of say 1.5 bar corresponds to a temperature of −20° C. and a pressure of say 3 bar corresponds to a temperature of 0° C. It follows from these figures, that it is possible to draw a precise conclusion regarding the prevailing temperatures based on the still substantial pressure differences.

Above all during the defrosting operation—the refrigerant may have a pressure corresponding to a particular temperature, which for example already lies within the range of a positive temperature, although ice residues are still present on parts of the pipe or the air in the dehumidifier is still at below 0° C. For this reason, it is particularly advantageous as well to combine the monitoring of the pressure of the refrigerant with a supplemental temperature monitoring operation in the section of the freeze-dehumidifier which lies closest to the suction pipe stub of the compressor.

It is believed that the invention and many of its attendant advantages will be understood from the foregoing description and it will be apparent that various changes may be made in the form, construction and arrangement of the parts and in the process without departing from the spirit and scope of the invention or sacrificing all of its material advantages, the form described merely being preferred embodiments thereof.

What is claimed is:

1. A method of compressing a gas in a gas compressor having a suction intake, which comprises the steps of
   (a) cooling the gas to a temperature below 0° C. in a gas cooling zone having a freeze-dehumidifier whereby an icy condensate is precipitated on the surface of the freeze-dehumidifier,
   (b) circulating a cooled refrigerant medium through the freeze-dehumidifier in a closed cycle including a suction conduit leading from the freeze-dehumidifier and a pressure conduit leading to the freeze-dehumidifier to cool the gas in said zone to below 0° C. whereby an icy condensate is precipitated on the surface of the freeze-dehumidifier,
   (c) intermittently defrosting the freeze-dehumidifier surface to remove the icy condensate therefrom while interrupting the circulation of the cooled refrigerant medium therethrough whereby cooled refrigerant medium remains standing in the freeze-dehumidifier,
   (d) monitoring the pressure of the cooled refrigerant medium standing in the freeze-dehumidifier after interruption of the circulation of the cooled refrigerant medium,
   (e) terminating the defrosting of the freeze-dehumidifier when the monitored pressure of the refrigerant medium exceeds a pressure corresponding to about 0° C. at the surface of the freeze-dehumidifier, and
   (f) monitoring the temperature of the gas in the suction intake of the compressor after it has passed through the gas cooling zone, and terminating the defrosting when the monitored gas temperature exceeds about 0° C.

2. The method of claim 1, wherein the closed cycle comprises a compressor for the refrigerant medium, the refrigerant medium compressor having a suction conduit communicating with the suction conduit of the freeze-dehumidifier and a pressure conduit, and comprising the further steps of circulating the refrigerant medium from the suction conduit of the freeze-dehumidifier through the refrigerant medium compressor, monitoring the pressure of the refrigerant medium in the suction conduit of the refrigerant medium compressor, and terminating the defrosting of the freeze-dehumidifier when the monitored pressure of the refrigerant medium in the suction conduit of the refrigerant medium compressor exceeds a pressure corresponding to about 0° C.

3. The method of claim 1, comprising the further step of causing the refrigerant medium to flow through an expansion valve into the pressure conduit at the end of the defrosting.

4. The method of claim 1, comprising the further step of restarting the circulation of the cooled refrigerant medium when the monitored gas temperature has reached at least +1° C.

5. A method of compressing a gas in a gas compressor having a suction intake, which comprises the steps of
   (a) cooling the gas to a temperature below 0° C. by causing the gas to flow to the suction intake of the gas compressor through a conduit system including two gas cooling zones having a respective freeze-dehumidifier including a heat exchanger whereby an icy condensate is precipitated on the surface of the heat exchanger of one of the freeze-dehumidifiers in one of the gas cooling zones, (b) intermittently gas-tightly closing off the other gas cooling zone from the suction intake of the gas compressor and defrosting the heat exchanger of the other freeze-dehumidifier in the other gas cooling zone while it is gas-tightly closed off, and (c) circulating a cooled gaseous refrigerant medium through the heat exchangers in a closed cycle conduit system including a suction conduit leading from each heat exchanger and a pressure conduit leading to each heat exchanger to cool the gas to below 0° C. in the one freeze-dehumidifier, the conduit system comprising (1) a compressor for the gaseous refrigerant medium whereby the refrigerant medium is liquefied, the refrigerant medium compressor having a suction conduit communicating with the suction conduit leading from each heat exchanger and a pressure conduit, and (2) a respective expansion valve for gasifying the liquefied refrigerant medium and leading to the pressure conduit of each heat exchanger, the pressure conduit of the refrigerant medium compressor communicating with the expansion valve leading to the pressure conduit of the heat exchanger of the one freeze-dehumidifier as well as the pressure conduit of the heat exchanger of the freeze-dehumidifier in the other gas cooling zone whereby a respective portion of the refrigerant medium coming from the compressor is recirculated to the expansion valve leading to the pressure conduit of the heat exchanger of the one freeze-dehumidifier and to the heat exchanger of the other freeze-dehumidifier.

6. The method of claim 5, wherein the conduit system comprises a refrigerant medium condenser communicating with the pressure conduit of the refrigerant medium compressor, the refrigerant medium being a gas liquefied in the condenser, further comprising the steps of causing the refrigerant medium from the compressor to flow to the freeze-dehumidifier being defrosted in parallel to the flow of the refrigerant medium from the compressor to the condenser, monitoring the pressure of the refrigerant medium coming from the condenser at said freeze-dehumidifier whereby the temperature thereof may be determined, terminating the defrosting when a predetermined temperature is reached, and pre-cooling the defrosted freeze-dehumidifier.

7. A method of compressing a gas having a temperature exceeding 0° C. in a gas compressor having a suction intake, which comprises the steps of (a) cooling the gas to a temperature below 0° C. in one gas cooling zone having a freeze-dehumidifier including a heat exchanger whereby an icy condensate is precipatated on the surface of the heat exchanger while defrosting the icy condensate on another heat exchanger of another freeze-dehumidifier of another gas cooling zone in which the gas has previously been cooled, each freeze-dehumidifier having an intake for the gas having a temperature exceeding 0° C. and an output for the cooled gas, (b) placing a gas-tight valve in each intake and output of the freeze-dehumidifiers, (c) connecting the freeze-dehumidifiers by a conduit, (d) placing a gas-tight valve in said conduit for opening and closing the conduit between the freeze-dehumidifiers, (e) opening the gas-tight valve in the intake of the freeze-dehumidifier in the other gas cooling zone while cooling the gas in the one gas cooling zone to cause the gas having a temperature exceeding 0° C. to flow over the other heat exchanger until the icy condensate thereon has been defrosted while closing the gas-tight valve in the conduit, and (f) closing the gas-tight valve in the intake of the freeze-dehumidifier of the other gas cooling zone and opening the gas-tight valve in the conduit after defrosting to cause the gas having a temperature exceeding 0° C. to flow to the freeze-dehumidifier of the one gas cooling zone through the conduit and opening the gas-tight valve in the output of the freeze-dehumidifier of the one gas cooling zone to cause the cooled gas to flow into the suction intake of the gas compressor.

8. The method of claim 7 wherein the gas is delivered between the freeze-dehumidifiers in the gas cooling zones and is caused to flow over the freeze-dehumidifier in the one gas cooling zone to the freeze-dehumidifier in the other gas cooling zone and thence to the suction intake of the gas compressor, the freeze-dehumidifier in the one gas cooling zone is pre-cooled, the delivery of the gas between the gas-tightly closed off gas cooling zone and the freeze-dehumidifier in the other gas cooling zone is interrupted while the other gas cooling zone is gas-tightly closed off from the suction intake, whereupon the other closed off gas cooling zone is opened, the one gas cooling zone is gas-tightly closed off again, the gas is delivered between the one closed off gas cooling zone and the freeze-dehumidifier therein, and the delivery of gas between the two freeze-dehumidifiers is interrupted.

9. The method of claim 7 comprising the further steps of delivering heat energy to the freeze-dehumidifier in the gas-tightly closed gas cooling zone, monitoring the temperature in the closed gas cooling zone, pre-cooling the defrosted freeze-dehumidifier in the closed gas cooling zone when the monitored temperature has reached a pre-set temperature corresponding to a defrosting temperature of the freeze-dehumidifier, whereupon the closed gas cooling zone is opened and the other gas cooling zone is gas-tightly closed.

* * * * *